United States Patent
Hohner

(10) Patent No.: US 8,716,384 B2
(45) Date of Patent: May 6, 2014

(54) PIGMENT CONCENTRATES

(75) Inventor: Gerd Hohner, Augsburg (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 13/387,487

(22) PCT Filed: Jul. 26, 2010

(86) PCT No.: PCT/EP2010/004560
§ 371 (c)(1),
(2), (4) Date: Jan. 27, 2012

(87) PCT Pub. No.: WO2011/012276
PCT Pub. Date: Feb. 3, 2011

(65) Prior Publication Data
US 2012/0123036 A1    May 17, 2012

(30) Foreign Application Priority Data

Jul. 28, 2009    (DE) .......................... 10 2009 034 914

(51) Int. Cl.
*C08L 91/06*    (2006.01)
*C08L 23/06*    (2006.01)

(52) U.S. Cl.
USPC ........... 524/275; 524/515; 524/570; 524/585; 106/502

(58) Field of Classification Search
USPC ......... 524/487, 277, 515, 275, 570, 582, 585; 523/351; 106/502
See application file for complete search history.

(56) References Cited

U.S. PATENT DOCUMENTS

| | | | |
|---|---|---|---|
| 3,553,177 A | 1/1971 | Hazen et al. | |
| 4,358,573 A * | 11/1982 | Verbrugge | .................... 526/272 |
| 4,776,887 A * | 10/1988 | Kuroda et al. | ............. 106/31.61 |
| 5,352,729 A | 10/1994 | Birkhofer et al. | |
| 5,744,523 A | 4/1998 | Barkowsky et al. | |
| 5,998,547 A * | 12/1999 | Hohner | ......................... 525/301 |
| 2006/0074176 A1 * | 4/2006 | Hohner | ......................... 524/515 |
| 2006/0188459 A1 | 8/2006 | Heinrichs et al. | |
| 2009/0137742 A1 | 5/2009 | Hohner | |

FOREIGN PATENT DOCUMENTS

| | | |
|---|---|---|
| CA | 2060802 | 8/1992 |
| DE | 3510233 | 10/1985 |
| DE | 19648895 | 8/1992 |
| DE | 4236337 | 1/1994 |
| DE | 10223402 | 12/2003 |
| EP | 0498195 | 8/1992 |
| EP | 0542033 | 5/1993 |
| EP | 1693047 | 8/2006 |
| EP | 2062925 | 5/2009 |

OTHER PUBLICATIONS

PCT International Search Report for PCT/EP 2010/004560, mailed Feb. 21, 2011.
English Translation of PCT International Preliminary Report on Patentability for PCT/EP2010/004560. ,mailed Feb. 7, 2012.

* cited by examiner

*Primary Examiner* — Hannah Pak
(74) *Attorney, Agent, or Firm* — Anthony A. Bisulca

(57) ABSTRACT

The invention relates to pigment concentrates for coloring thermoplastics, comprising—at least one color pigment—at least one copolymer wax, produced by converting long-chain olefin hydrocarbon in the chain length range of ≥12 C-atoms having unsaturated polycarboxylic acids or anhydrides thereof in the presence of at least one radical starter and comprising a) 40-60 mol-% units derived from α-olefins of the chain length $C_{12}$-$C_{60}$, preferably $C_{24}$-$C_{60}$, particularly preferably $C_{28}$-$C_{60}$ and b) 60-40 mol-% units that derive from unsaturated polycarbolxylic acids or anhydrides thereof, and at least one thermoplastic polyolefin as applicable.

8 Claims, No Drawings

PIGMENT CONCENTRATES

The present invention relates to pigment concentrates for coloring thermoplastics, comprising at least one pigment and at least one copolymer wax, where the latter is produced from a long-chain α-olefin and from an unsaturated polycarboxylic acid or anhydride thereof.

The use of pigment concentrates or pigment preparations for coloring thermoplastics is prior art. These concentrates comprise not only the pigment but also polar or nonpolar components as dispersion aid, and also optionally polymers as carrier material. The premixing of the pigment with the dispersion auxiliary permits efficient disruption of the pigment agglomerates and effective distribution of the color particles. This is a precondition for efficient coloring within the plastic to be colored, since pigments develop their full coloristic performance only within certain ranges of particle size. When the concentrate is incorporated into the plastic, the dispersion achieved of the colorant particles, in comparison with that achieved during direct mixing to incorporate the undiluted pigment, is more rapid and more homogeneous, and comprises finer particles.

Since the tinting strength achieved within the plastic is critically dependent on the quality of pigment dispersion, substantial technical and economic significance is attached to the nature of the concentrate used. In order to achieve maximum fineness of distribution of the pigment particles in the concentrate, effective mixing techniques are used to mix pigment, dispersion aid, and carrier material, i.e. suitable dispersion apparatuses are used, examples being screw-based extruders, or heated roll mills, or kneaders. An important factor here is the introduction of sufficiently high shear forces, but an equally important part is also played by the chemical and physical properties of the dispersion aids used. The rheological behavior and polarity of these can make an effective contribution to the wetting and comminution of the pigments.

Dispersion quality can be assessed by utilizing the filter pressure generated during the filtration of the colored plastic, and also by utilizing colorimetric data. Another useful evaluation criterion is the homogeneity of a test foil produced from the colored plastic.

Examples of dispersion aids used in pigment concentrates are fatty acid derivatives, and also noncrystalline or semicrystalline, polar or nonpolar homo- or copolymers, in particular those with low molecular weights, e.g. waxes.

DE-A-4 236 337 discloses the use of low molecular-weight polymers made of $C_{12}$-$C_{22}$-alkyl acrylates as dispersion auxiliaries for solids, inter alia pigments, in organic media. The synthesis is complicated and uses free-radical polymerization of $C_1$-$C_4$-alkyl acrylates and subsequent transesterification of the polymers with $C_{12}$-$C_{22}$-alkyl or alkenyl alcohols.

DE-A-10223402 discloses that copolymers composed of
units derived from α-olefins of chain length $C_{12}$-$C_{60}$,
units derived from unsaturated monocarboxylic acids,
units derived from esters of unsaturated monocarboxylic acids, and also
units derived from styrene or methyl-substituted styrene
can be used as constituent of pigment concentrates for coloring thermoplastics. The copolymers exhibit good, but not ideal, effectiveness in terms of the test parameters filter pressure and tinting strength.

An object was therefore to provide, by a route which avoids complicated synthetic methods, dispersing agents with improved effectiveness for use in pigment concentrates.

There are known copolymers produced by a free-radical route from long-chain α-olefins and maleic anhydride. By way of example, U.S. Pat. No. 3,553,177 describes a process for copolymerizing mixtures of aliphatic olefins with maleic anhydride. The reaction is carried out with the aid of peroxides and in the presence of ketones as solvents.

DE-A-3 510 233 moreover discloses reaction products from long-chain olefins with maleic anhydride.

EP-A-1 693 047 discloses copolymer waxes for cosmetic, pharmaceutical, and dermatological preparations, produced from $C_{26}$-$C_{60}$-α-olefins and maleic anhydride. The waxes are emulsifiable and are suitable for adjusting the consistency of pastes, creams, and sticks, and especially feature high water resistance. They also improve absorption capability and facilitate dispersion of pigments into the lipid phase of cosmetic preparations. Inventive example 11 describes the production of a mascara formulation, where pigment is stirred into a melt composed of emulsifier, stearic acid, copolymer wax, silicones, natural ester waxes, and hydrogenated oligoolefin, and this melt is then further processed to give an aqueous preparation.

Surprisingly, it has been found that copolymer waxes produced from long-chain α-olefins and from unsaturated polycarboxylic acids or anhydrides thereof have excellent suitability as component for producing pigment concentrates for coloring thermoplastics.

The plastics materials colored with pigment concentrates of this type exhibit high strengths of color and good homogeneities. Melts thereof exhibit low filter values, and this is equivalent to effective dispersion of the pigment particles.

Production of the copolymer waxes present as dispersion aids in the pigment concentrates is particularly simple, since all that is necessary is to react two components with one another.

The invention therefore provides pigment concentrates for coloring thermoplastics, comprising
at least one color pigment,
at least one copolymer wax produced via reaction of long-chain olefin hydrocarbons in the chain length range ≥12 carbon atoms with unsaturated polycarboxylic acids or anhydrides thereof in the presence of at least one free-radical initiator, and comprising
a) from 40 to 60 mol % of units which derive from α-olefins of chain length $C_{12}$-$C_{60}$, preferably $C_{24}$-$C_{60}$, particularly preferably $C_{28}$-$C_{60}$, and also
b) from 60 to 40 mol % of units which derive from unsaturated polycarboxylic acids or from anhydrides thereof, and also
optionally at least one thermoplastic polyolefin.

Production of the copolymer waxes can use either α-olefins having a single type of chain or α-olefin mixtures, for example those arising as distillation cuts or distillation residues in the known production processes. Industrial α-olefin mixtures, in particular those having relatively high chain length, can comprise not only 1-alkenes but varying amounts of internal and pendent olefinic double bonds (vinylene groups and vinylidene groups). One preferred α-olefin raw material that can be used is the olefin mixture obtainable from Chevron Phillips with trade name Alpha Olefin $C_{30}$+, having chain lengths in essence from 28 to 52 carbon atoms.

Representative examples of the unsaturated polycarboxylic acids and, respectively, anhydrides used for the reaction with the α-olefins are maleic acid, fumaric acid, citraconic acid, mesaconic acid, aconitic acid, or itaconic acid, and the respective anhydrides of said polycarboxylic acids, to the extent that they are accessible. Maleic anhydride is preferred. It is also possible to use mixtures of these polycarboxylic acids and anhydrides in any desired ratios.

It is preferable to use maleic anhydride.

The copolymer waxes of the invention are produced in a manner known per se via reaction of the abovementioned components at elevated temperature with addition of organic or inorganic free-radical-generating initiators. The reaction can be carried out in the presence or absence of a solvent. The latter method is preferred. The reaction can moreover be carried out either batchwise, e.g. in a stirred tank, or in a continuously operating reactor.

In the case of the free-radical copolymerization of α-olefins with maleic anhydride, the product is generally approximately alternating copolymer structures. The molar usage ratio of polycarboxylic anhydride and α-olefin is therefore preferably from 0.4:0.6 to 0.6:0.4. If a commercially available α-olefin in the typical chain length range is used—$C_{28}$-$C_{52}$ with an average molar mass of about 500 g/mol—the amount used, based on α-olefin, is therefore about 13 to 29% by weight of anhydride. Preferred maleic anhydride usages for olefin raw materials of this type are from 14 to 20% by weight, particularly from 15 to 18% by weight.

Examples of suitable organic initiators are peroxides, for example alkyl hydroperoxides, or dialkyl or diaryl peroxides, diaroyl peroxides, peresters, or azo compounds. Dialkyl peroxides are preferred, and di-tert-butyl peroxide is specifically preferred. However, it is also possible to use any other initiator as long as it decomposes into free radicals at the selected reaction temperature and is capable of initiating the reaction. The amount used of the initiators is from 0.1 to 10% by weight, preferably from 0.5 to 5.0% by weight, based on α-olefin used.

If the reaction is carried out in the absence of solvent, the reaction temperatures are above the melting point of the α-olefin, for example from 100 to 200° C., preferably from 120 to 180° C., particularly preferably from 140 to 170° C. If solvents are present, it is also possible to use reaction temperatures below the melting point of the α-olefin, as a function of solubility.

Pigments suitable for producing the pigment concentrate are any of those used for coloring plastics. Either inorganic or organic pigments can be used.

Examples that may be mentioned of inorganic pigments are carbon black, metal powders, metal oxides, such as titanium dioxide, zinc oxide, and iron oxides, metal sulfides, silicates, such as ultramarine blue, chromates, and vanadates.

Examples of organic pigments are azo or disazo pigments, laked azo pigments, metal phthalocyanine pigments, quinacridone pigments, perylene pigments, dioxazine pigments, anthraquinone pigments, thioindigo pigments, diaryl pigments, triphenylmethane pigments, or quinophthalone pigments.

Other examples of pigments that can be used are found in relevant standard literature, e.g. Herbst, Hunger, Industrielle organische Pigmente [Industrial Organic Pigments], 2nd edition 1995, pp. 4-11.

The pigment concentrates of the invention can moreover comprise, as carrier material, homo- or copolymeric thermoplastic polyolefins, e.g. polyethylene of high density (HDPE) or of low density (LDPE, LLDPE), polypropylene, polystyrene, or copolymers having contents of monomers comprising heteroatoms, e.g. ethylene-vinyl acetate copolymers, or ethylene-(meth)acrylic acid copolymers.

For further performance optimization, the concentrate can also comprise, alongside the colorant pigment, the copolymer wax, and optionally the thermoplastic polyolefin, additional components that promote pigment dispersion, for example fat derivatives, e.g. fatty acid esters or the corresponding soaps, or waxes of natural or synthetic origin, e.g. polyolefin waxes. Examples of polyolefin waxes that can be used are polyethylene waxes or polypropylene waxes, both of which are produced via thermal degradation of polyolefin, via free-radical synthesis, e.g. starting from ethylene, optionally in combination with other polar monomers, such as (meth)acrylates or vinyl acetate, or via polymerization with the aid of metal-containing coordination catalysts of the Ziegler-Natta, Phillips, or metallocene type. Other materials that can be used are waxes of natural origin, e.g. montan wax or carnauba wax, or downstream products of these obtainable by way of example via oxidative bleaching or other chemical derivatization methods, e.g. saponification. Appropriate materials and production processes are set out by way of example in Ullmann's Encyclopedia of Industrial Chemistry, 5th ed. 1996, Vol. A 28, pp. 103-160.

The pigment concentrates of the invention comprise from 10 to 70% by weight of one or more pigments, from 1 to 60% by weight of the copolymer wax produced from α-olefin from unsaturated polycarboxylic acid or anhydride thereof, and from 0 to 60% by weight of one or more thermoplastic polyolefins.

The pigment concentrates preferably comprise from 20 to 60% by weight of pigment, from 10 to 40% by weight of copolymer wax, and from 10 to 50% by weight of polyolefin.

The pigment concentrates of the invention can also comprise up to 5% by weight of stabilizing additives, e.g. antioxidants or light stabilizers.

The invention further provides a plastics molding composition or a finished plastics product colored with the pigment concentrate of the invention.

In a method that has proven successful for producing the pigment concentrate, the individual solid components are first mixed in suitable mixing assemblies. This can be achieved in a known manner via hot or cold mixing.

Copolymer wax and optionally other waxes here can be used in coarse- to fine-particle, or else micronized, form, and in the latter case by way of example with median particle sizes ($d_{50}$ values) from 5 to 15 μm. The micronization can be achieved via spraying of the wax melt or via milling, e.g. with the aid of air-jet mills. The spraying or milling process can optionally be followed by classification. The actual dispersion of the pigment is then achieved via melting and kneading of the premix in an extruder or kneader. The melt is then processed in a conventional manner known from polymer technology, e.g. to give granules or pellets.

The pigment concentrates of the invention are suitable for coloring thermoplastically processable polymers of a very wide variety of constitutions, examples being polyolefins, such as polyethylene, copolymers of ethylene with other nonpolar olefins or with polar olefins, polypropylene, and also polybutadiene or polystyrene, and moreover polyalkylene terephthalate, poly(meth)acrylate, polyamide, polyvinyl chloride, polyacrylonitrile, polysulfone, polyether ketone, polyoxymethylene, acrylonitrile-butadiene-styrene terpolymers, etc.

EXAMPLES

The dynamic viscosities of the copolymer waxes were determined in the melt to DIN 53019-1 to 3 with a rotary viscometer, and the drop points were determined with the aid of FP 900 equipment from Mettler to ASTM D3954. Acid numbers were determined to DIN 53402, except that the solvents used were anhydrous ethanol and toluene, in order to avoid hydrolytic cleavage of the anhydride groups. The particle size analysis of micronizates was carried out by laser diffraction using Mastersizer 2000 equipment (Malvern) and a Scirocco 2000 dispersion unit.

Example A

Production of a Copolymer Wax ("Copolymer Wax A") Made of α-olefin and Maleic Anhydride 2500 g=4.92 mol of α-olefin $C_{30}$+(olefin mixture from Chevron Phillips) were melted under a blanket of nitrogen in a glass apparatus equipped with stirrer, internal thermometer, and distillation bridge. 375 g=3.83 mol of maleic anhydride were then divided into six equal portions and these were metered into the mixture at intervals of respectively 30 min. 50 g of di-tert-butyl peroxide were added continuously from a dropping funnel over the entire period. The reaction was then allowed to continue for 1 h. Volatile fractions were then removed by distillation in vacuo (about 30 mbar). After about 30 min., the system was depressurized to atmospheric pressure by introducing nitrogen. The acid number of the resultant copolymer wax was 80 mg KOH/g, viscosity at 90° C. was 329 mPa*s, and drop point was 74° C.

Comparative Example

A copolymer ("copolymer V") made of $C_{26-60}$-α-olefin, methyl acrylate, and acrylic acid was produced as in DE-A-102 23 402 A1, p. 3, line 55 ff (acid number 7 mg KOH/g, drop point 71° C.).

For the performance tests, the copolymer wax was used either in coarsely milled form (laboratory mill, grain size $d_{100}$<2 mm, "fine grain") or in micronized form "micronizate"). Micronization was achieved via milling in a 100 AFG air-jet mill (Hosokawa Micron) and gave product in the form of fine powder with $d_{100}$ value <30 μm and $d_{50}$ value 8.0 μm.

The coarsely milled or micronized copolymer wax was mixed in a Henschel mixer with the respective pigment, and also with the polyolefins stated below (cold mixing, 600 rpm, duration 10 min). The mixture was then compounded in a twin-screw extruder (Berstorff ZE 25×40 D) to give granules. These were incorporated as in DIN-EN 13900-5 into plastic, and the mixture was characterized by means of a pressure filter test. Dispersion quality was also determined colorimetrically via measurement of tinting strength to DIN 55980.

For the pressure filter test, the melt of the thermoplastic colored with the pigment concentrate was forced by a gear pump through a filter sieve, and the pressure generated upstream of the filter was measured. As pigment dispersion becomes poorer, the pressure generated upstream of the filter becomes higher. The "filter value" F is used as a measure of the filter pressure and is determined from the following relationship:

$$F=(P_{max}-P_o)/m_w [bar/g]$$

where $P_{max}$ is the maximum pressure measured upstream of the filter, $P_o$ is the pressure upstream of the filter for the uncolored plastic, and $m_w$ is the mass of the dispersion medium passed through the system.

To determine the "film grade", LDPE colored with 2% by weight of the pigment concentrate was processed on a blowing-film plant to give a film of layer thickness about 0.04 mm. The film was assessed visually using ×5 enlargement or photographically with the aid of an automatic evaluation system to identify specks and other inhomogeneity phenomena, and was evaluated using grades from 1 (good) to 5 (poor).

Performance Testing

Example 1

Testing of a pigment concentrate composed of Fast Blue A4R pigment (Cu phthalocyanine), Escorene LL 6101 (LLDPE, produced by Exxon) and copolymer wax A and, respectively, copolymer V in a ratio of 2:2:1 by weight after incorporation into PE matrix.

Results:

|  | Matrix | Copolymer wax A (fine grain) | Copolymer wax A (micronizate) | Copolymer V*) (fine grain) | Reference without wax |
|---|---|---|---|---|---|
| Filter value [bar/g] | Riblene FL 30 PE (Polimeri Europa) | 0.82 | 0.36 | 1.30 | 3.38 |
| Relative tinting strength [%] | Hostalen GC 7260 PE (LyondellBasell) | 106 | 108 | 102 | 100 |

*)Comparative example

Example 2

Testing of a pigment concentrate composed of Pigment Blue 15:1 (Cu phthalocyanine), HG 245 (PP homopolymer, Borealis) and copolymer wax A in a ratio of 2:2:1 by weight after incorporation into PP matrix.

Results:

|  | Matrix | Copolymer wax A (fine grain) | Copolymer wax A (micronizate) | Reference without wax |
|---|---|---|---|---|
| Filter value [bar/g] | Borclear RB 707 (Borealis) | 1.92 | 0.94 | 10.2 |
| Relative tinting strength [%] | Moplen HP 500N (LyondellBasell) | 103 | 103 | 100 |

Example 3

Testing of a pigment concentrate composed of Echtviolett RL pigment, Escorene LL 6101 (LLDPE, produced by Exxon) and copolymer wax A in a ratio of 2:2:1 by weight after incorporation into PE matrix.

Results:

|  | Matrix | Copolymer wax A (fine grain) | Copolymer wax A (micronizate) | Reference without wax |
|---|---|---|---|---|
| Filter value [bar/g] | Riblene FL 30 PE (Polimeri Europa) | 0.12 | 0.14 | 0.76 |
| Relative tinting strength [%] | Hostalen GC 7260 (LyondellBasell) | 97 | 114 | 99 |
| Film grade | Sabic 2102 TX PE (Sabic) | 2.0 | 2.5 | 3.0 |

Example 4

Testing of a pigment concentrate composed of Pigment Violet 23, Escorene LL 6101 (LLDPE, produced by Exxon) and copolymer wax A in a ratio of 2:2:1 by weight after incorporation into PP matrix.

Results:

|  | Matrix | Copolymer wax A (fine grain) | Copolymer wax A (micronizate) | Reference without wax |
|---|---|---|---|---|
| Filter value [bar/g] | Borclear RB 707 (Borealis) | 0.28 | 0.36 | 2.92 |
| Relative tinting strength [%] | Moplen HP 500N (LyondellBasell) | 101 | 105 | 100 |

Example 5

Testing of a pigment concentrate composed of Pigment Green 7 (Cu phthalocyanine pigment), polyethylene terephthalate (Bripet 2000 BST, Brilèn), and copolymer wax A in a ratio by weight of 30:65:5 after incorporation into PET matrix Results:

|  | Matrix | Copolymer wax A (fine grain) | Copolymer wax A (micronizate) | Reference without wax |
|---|---|---|---|---|
| Filter value [bar/g] | Polyclear 3304 PET | 2.8 | 4.18 | 18.7 |
| Relative tinting strength [%] | Polyclear 3304 PET | 114 | 115 | 100 |

The invention claimed is:

1. A pigment concentrate for coloring thermoplastics, comprising
   10 to 70% by weight of at least one color pigment,
   1 to 60% by weight of at least one copolymer wax produced by reaction of long-chain olefin hydrocarbons in the chain length range ≥12 carbon atoms with unsaturated polycarboxylic acids or anhydrides thereof in the presence of at least one free-radical initiator, and comprising
   a) from 40 to 60 mol % of units derived from α-olefins of chain length $C_{12}$-$C_{60}$, and also
   b) from 60 to 40 mol % of units derived from unsaturated polycarboxylic acids or anhydrides thereof, and also 0 to 60% by weight of at least one thermoplastic polyolefin.

2. The pigment concentrate as claimed in claim 1, comprising from 20 to 60% by weight of at least one color pigment, from 10 to 40% by weight of at least one copolymer wax, and from 0 to 50% by weight of at least one thermoplastic polyolefin.

3. The pigment concentrate as claimed in claim 1, comprising up to 5% by weight of stabilizing additives.

4. A plastics molding composition or finished plastics product colored with the pigment concentrate as claimed in claim 1.

5. A colored thermoplastic colored by the pigment concentrate as claimed in claim 1.

6. The colored thermoplastic as claimed in claim 5, wherein the copolymer wax is used in micronized form with a d50 value from 5 to 15 µm.

7. The pigment concentrate as claimed in claim 1, wherein from 40 to 60 mol % of units derived from α-olefins are of chain length $C_{24}$-$C_{60}$.

8. The pigment concentrate as claimed in claim 1, wherein from 40 to 60 mol % of units derived from α-olefins are of chain length $C_{28}$-$C_{60}$.

* * * * *